A. E. WALE.
TIRE.
APPLICATION FILED MAR. 4, 1914.
1,227,348.                              Patented May 22, 1917.
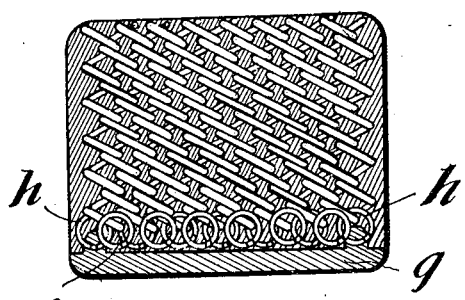
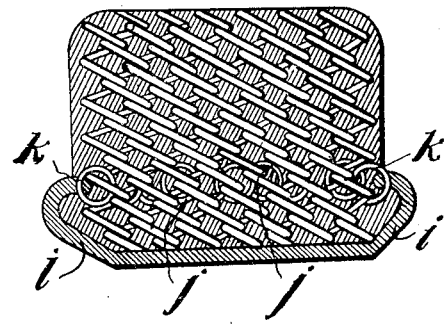
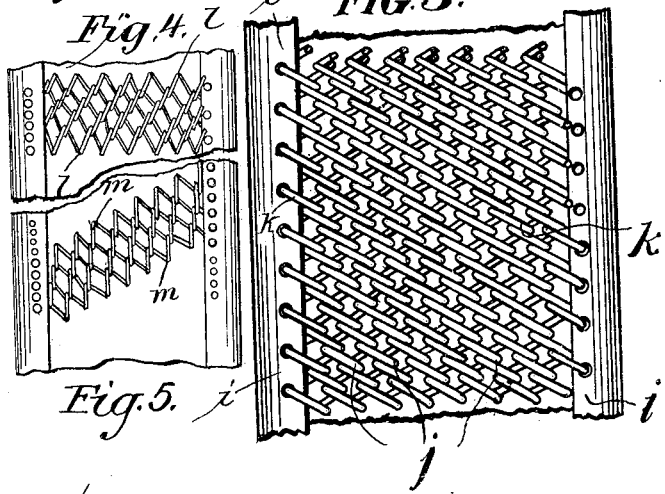

UNITED STATES PATENT OFFICE.

ALFRED EDMUND WALE, OF COLESHILL, ENGLAND.

TIRE.

1,227,348.     Specification of Letters Patent.     Patented May 22, 1917.

Application filed March 4, 1914. Serial No. 822,430.

*To all whom it may concern:*

Be it known that I, ALFRED EDMUND WALE, a subject of the King of Great Britain, residing at Coleshill, county of Warwick, England, manufacturer, have invented certain new and useful Improvements in Tires; and I do hereby declare the following to be a full, clear, and exact description of the same.

This invention relates to improvements in tires and more particularly to what are known as solid tires but is not necessarily limited thereto.

The invention relates to tires in which helices of wire or springs are combined with the rubber or like material of the tire and has for its object to insure a more effective anchoring together of the helices and the material of the tire and a more effective anchoring of the tire to the rim.

In accordance with the invention a base is provided to which the helices or springs, or certain of them, are anchored. The "base" may be a layer or layers of helical interwoven wire material or helices arranged parallel to the rim of the wheel.

On the drawings:

Figure 1 is a sectional view of a tire constructed in accordance with the invention.

Fig. 2 is an arrangement similar to Fig. 1 but with the "base" secured across an ordinary channel rim.

Fig. 3 is a plan of a rim without the rubber tire showing the arrangement of the helices circumferentially therein.

Fig. 4 is a plan view showing transverse helices for forming the base connected to the flange edges of the rim. Fig. 5 is a view similar to Fig. 4 but showing the helices as diagonal with respect to the plane which includes the axis of rotation of the tire.

When using helical material for the base I employ one or more plies of the material disposed parallel with the axis of the wheel with the axes of the helices arranged preferably circumferentially with respect to the tire. This base may be connected into a complete ring as shown at *f*, Fig. 1, and may be secured to a metal band *g* or to a rim by fastening certain of its helices *h* to holes formed in flanges formed on the band or rim *g* of which flanges there may be two or more as desired.

If a rim with ordinary flanges *i* is employed and the helices of the "base" *j* are arranged circumferentially, a helix *k* on each side may be threaded or coiled through holes right around the rim flange, if these holes are spaced to agree with the pitch of the helix. By this means the base *j* may be rapidly constructed and anchored on the rim. This arrangement of the "base" is shown at Figs. 2 and 3.

Even when the helices are transversely or diagonally arranged they can be threaded so that their ends pass through holes in the rim flanges and each helix can be anchored by bending or clenching over its ends. Examples of the transverse and diagonal helices in the rim are shown at *l* and *m*, Figs. 4 and 5.

Into the wire base *f*, Fig. 1, *j* Figs. 2 and 3, or *l* in Fig. 4, and *m* in Fig. 5, we may thread helices radially to the tire, or slightly inclined to the radial position, to make up the framework. I may arrange the strips of material upon this base and anchor them to it by interlacing helices threaded down into the wire base so that they engage with the helices of the base.

In all cases it is preferred that the helices shall be interlaced with each other so that an interlaced structure is the finished result because the helices are all then supported and when their ends are in contact with the road and subject to severe strain they are supported by a large number of others and cannot be torn from their place or moved relatively to the rubber. Notwithstanding this preferenec in my own use of this invention it will be understood that as the method which characterizes the invention is equally applicable to helices arranged radially and not interlaced, I consider this within the ambit of my invention.

What I claim then is:

1. The combination with a rim of a tire mounted thereon and comprising in combination a body, a base of interlaced wire helices arranged circumferentially of said rim, said rim having apertured portions rigid therewith to which said helices are connected, a second set of interlaced wire helices arranged substantially radially in said body, said radial wire helices being threaded at their ends nearest the said rim into the interlaced helices of said base.

2. The combination with the rim of a wheel of a tire mounted thereon and comprising a body, a base of interlaced wire helices arranged circumferentially of said rim, said rim having portions rigid therewith to which said helices are connected, a second set of wire helices arranged substantially radially in said body, said radial wire helices being threaded at their ends nearest the said rim with the interlaced helices of said base.

In testimony whereof I affix my signature in presence of two witnesses.

ALFRED EDMUND WALE.

Witnesses:
F. G. BRETTELL,
C. K. SHEPHERD.

Copies of this patent may be obtained for five cents each, by addressing the "Commissioner of Patents, Washington, D. C."